United States Patent
Araishi (10) Patent No.: US 10,520,876 B2
(45) Date of Patent: Dec. 31, 2019

(54) IMAGE FORMING APPARATUS

(71) Applicant: KYOCERA Document Solutions Inc., Osaka (JP)

(72) Inventor: Kuniaki Araishi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/402,661

(22) Filed: May 3, 2019

(65) Prior Publication Data

US 2019/0346806 A1 Nov. 14, 2019

(30) Foreign Application Priority Data

May 10, 2018 (JP) ................................ 2018-091593

(51) Int. Cl.
  *G03G 15/00* (2006.01)
  *G03G 21/16* (2006.01)
  *G06F 3/12* (2006.01)

(52) U.S. Cl.
  CPC ..... *G03G 21/1619* (2013.01); *G03G 21/1647* (2013.01); *G06F 3/1238* (2013.01); *G03G 2215/00092* (2013.01); *G03G 2221/1696* (2013.01)

(58) Field of Classification Search
  CPC ............... G03G 15/5066; G03G 21/16; G03G 21/1619; G03G 21/1647; G03G 2215/00092; G03G 2221/16; G03G 2221/1678; G03G 2221/1696; G06F 3/1238; B41J 29/02
  See application file for complete search history.

(56) References Cited

U.S. PATENT DOCUMENTS

| | | | | |
|---|---|---|---|---|
| 2013/0320082 A1* | 12/2013 | Mun | ................... | G03G 15/5066 235/380 |
| 2014/0239064 A1* | 8/2014 | Onishi | ............... | G03G 15/5066 235/380 |
| 2016/0057296 A1* | 2/2016 | Tamura | .............. | G03G 15/5091 358/1.13 |
| 2018/0013905 A1* | 1/2018 | Kuroki | ................... | G03G 15/50 |

FOREIGN PATENT DOCUMENTS

| | | | |
|---|---|---|---|
| JP | 2012078521 A | * | 4/2012 |
| JP | 2016-60174 | | 4/2016 |
| JP | 2016168741 A | * | 9/2016 |

OTHER PUBLICATIONS

Machine translation of JP 2012-078521 A (publication date of Apr. 19, 2012) printed on Oct. 7, 2019.*
Machine translation of JP 2016-168741 A (publication date of Sep. 23, 2016) printed on Oct. 7, 2019.*

* cited by examiner

*Primary Examiner* — Sophia S Chen
(74) *Attorney, Agent, or Firm* — Wenderoth, Lind & Ponack, L.L.P.

(57) ABSTRACT

An image forming apparatus includes a height determining member that performs the positioning of a holder in a height direction. When the holder is not mounted, the height determining member is assembled to a predetermined frame member to serve as a part of the predetermined frame member.

3 Claims, 10 Drawing Sheets

IMAGE FORMING APPARATUS

CROSS-REFERENCE TO RELATED APPLICATION

This application is based upon and claims the benefit of priority from Japanese Patent Application No. 2018-091593 filed on May 10, 2018, the entire contents of which are incorporated herein by reference.

BACKGROUND

The technology of the present disclosure relates to an image forming apparatus in which an IC card reader can be mounted as an option.

In recent years, as user's security awareness is raised, image forming apparatuses provided with an IC card reader are becoming widespread. The IC card reader has a detection surface that reads information of a contactless IC card to which data such as a personal code has been input. When a user holds the IC card over the detection surface, the data input to the IC card is read by the IC card reader. The IC card reader is not always provided as standard in the image forming apparatuses and may be provided as an option device.

As such an image forming apparatus, an example in which the IC card reader is mounted on an operation panel has been proposed. The IC card reader is held in a box-like holder in order to facilitate wiring work, and is then mounted on the operation panel. The operation panel is provided with a receiving part for receiving the holder. The receiving part is surrounded by a bottom surface and a side surface and is formed on one surface thereof with an opening. The detection surface of the IC card reader is located at a predetermined position in the vicinity of the opening.

SUMMARY

An image forming apparatus according to one aspect of the present disclosure includes a holder receiving part. In the holder receiving part, a holder for holding an IC card reader is mounted as an option component.

Furthermore, the image forming apparatus includes a height determining member. The height determining member performs the positioning of the holder in a height direction. When the holder is not mounted, the height determining member is assembled to a predetermined frame member to serve as a part of the predetermined frame member. When the holder is mounted, the height determining member is separated from the predetermined frame member, is used by changing a direction thereof, and is interposed between the holder and a bottom surface of the holder receiving part to allow a detection surface of the IC card reader to be positioned at a predetermined height.

DETAILED DESCRIPTION

Hereinafter, an example of an embodiment will be described in detail on the basis of the drawings. It is noted that the technology of the present disclosure is not limited to the following embodiment.

Embodiment

Figure 1:
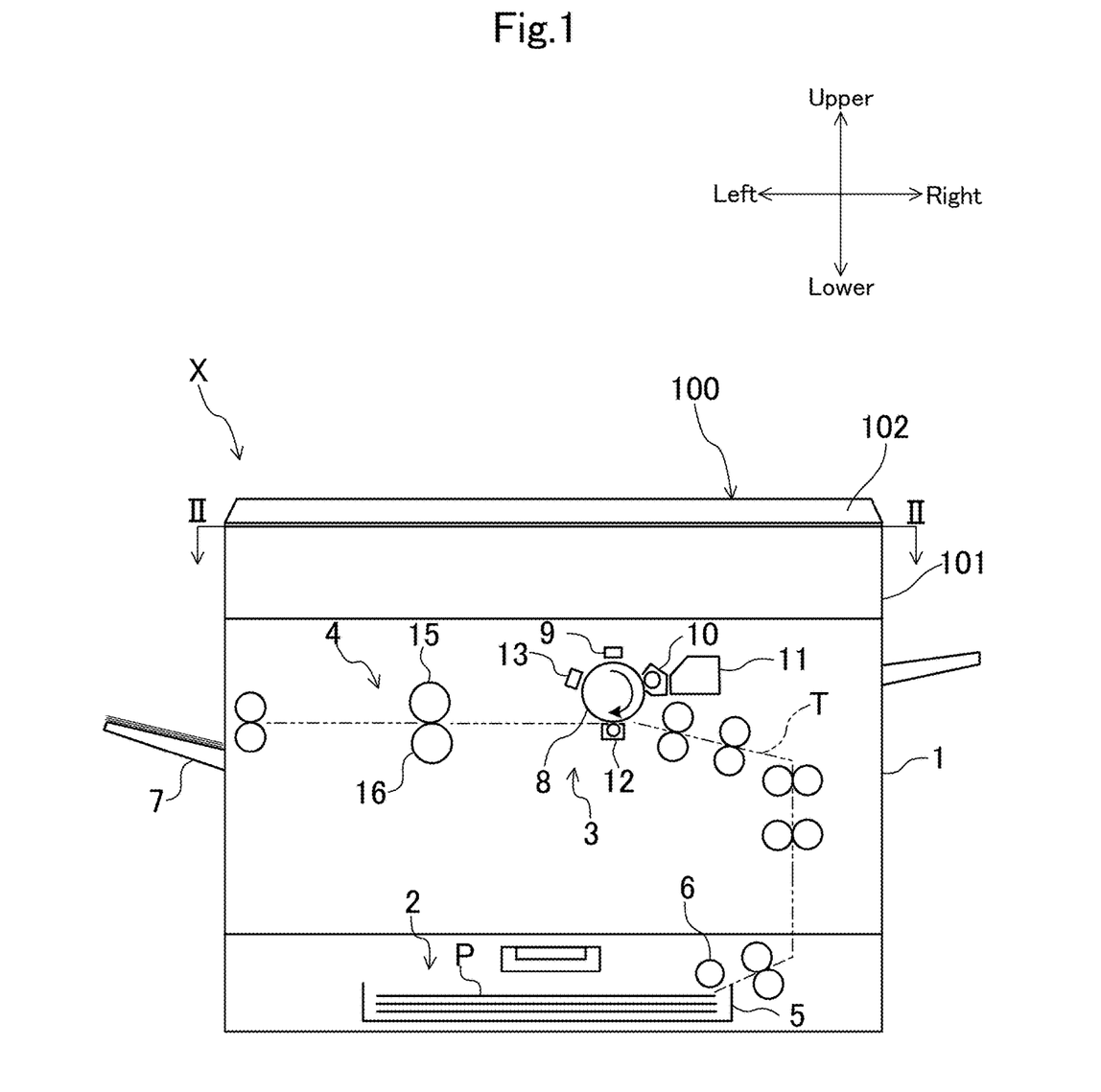
FIG. 1 is a schematic view illustrating an overall configuration of an image forming apparatus in an embodiment.
Figure 2:
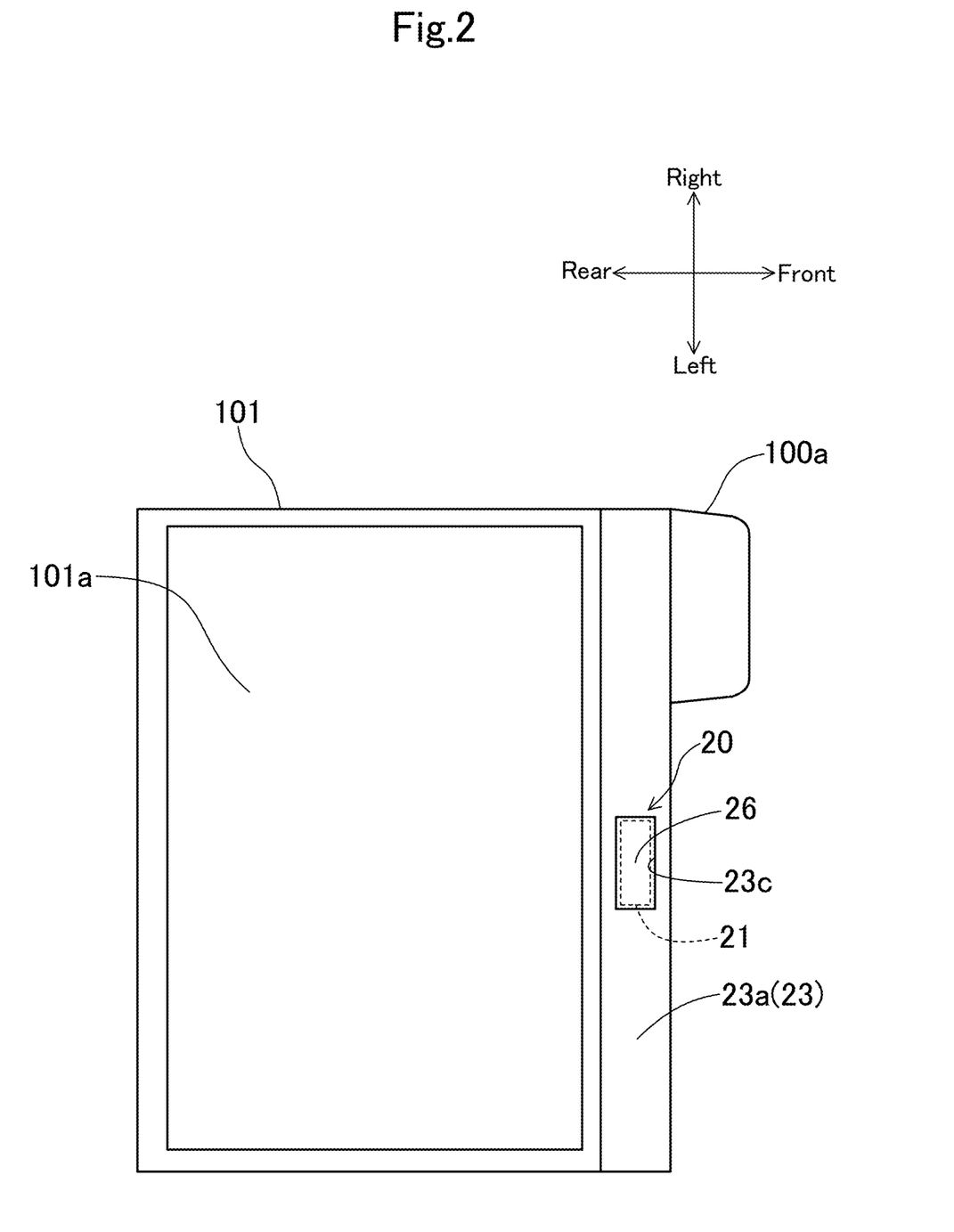
FIG. 2 is a schematic view corresponding to a section taken along line II-II in FIG. 1.
Figure 3:
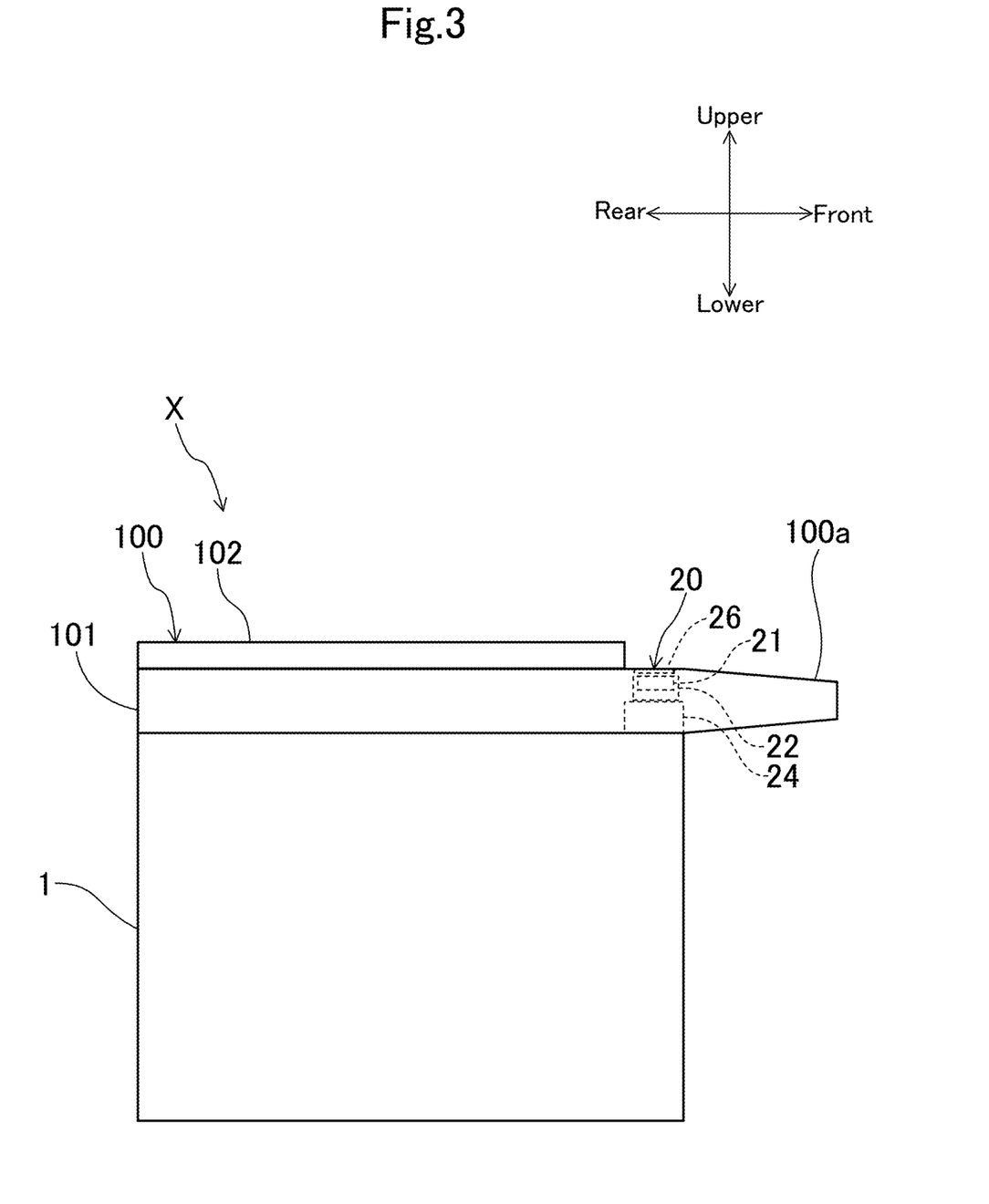
FIG. 3 is a schematic side view when the image forming apparatus is viewed from a left side.

FIG. 1 to FIG. 3 illustrate an image forming apparatus X in an embodiment. The image forming apparatus X is a copy machine that prints a document image read by an image reading device 100. The image forming apparatus X is not limited to the copy machine and may be a facsimile, a multifunctional peripheral (MFP) capable of performing a plurality of kinds of jobs, and the like. In the following description, a front side and a rear side indicate a front side and a rear side (a front side and a rear side in a direction perpendicular to the paper surface of FIG. 1) of the image forming apparatus X, and a left side and a right side indicate a left side and a right side when the image forming apparatus X is viewed from the front side.

The image forming apparatus X includes an image forming apparatus body 1 having a rectangular box shape in appearance, and the image reading device 100 is disposed on an upper side of the image forming apparatus body 1. An operation panel 100a is projected from a front side surface of the image reading device 100 (see FIG. 2 and FIG. 3). Furthermore, the image forming apparatus X includes an information reading unit 20 that reads information of an IC card as will be described later.

Referring to FIG. 1, the image forming apparatus body 1 has a sheet feeding unit 2, an image forming unit 3, and a fixing unit 4. The sheet feeding unit 2 has a sheet feeding cassette 5 that stores a plurality of sheets P stacked in a bundle shape, and a pick-up roller 6 that takes out the sheets P in the sheet feeding cassette 5 one by one and supplies the taken-out sheets P to a predetermined sheet conveyance path T. The sheet conveyance path T extends upward from the sheet feeding unit 2, extends in a horizontal direction, and then is connected to a document discharge tray 7.

The image forming unit 3 includes a photosensitive drum 8, a charging device 9, a developing device 10, a toner container 11, a transfer roller 12, and a electricity removing device 13. In the image forming unit 3, an image is formed on the sheet P, which is supplied from the sheet feeding unit 2, in the following procedure. Specifically, the charging device 9 charges the photosensitive drum 8 to a predetermined electric potential. Next, a laser scanning unit (LSU; not illustrated) irradiates a surface of the photosensitive drum 8 with light based on image data, thereby forming an electrostatic latent image on the surface of the photosensitive drum 8. Then, the developing device 10 supplies toner to the electrostatic latent image on the photosensitive drum 8, thereby developing the electrostatic latent image. The transfer roller 12 is rotated in press contact with the surface of the photosensitive drum 8 while interposing the sheet P between the transfer roller 12 and the photosensitive drum 8. At this time, a transfer voltage is applied to the transfer roller 12, so that the toner image on the surface of the photosensitive drum 8 is transferred to the sheet P. The electricity removing device 13 removes the charge on the surface of the photosensitive drum 8 after the toner image is transferred to the sheet P.

The fixing unit 4 has a fixing roller 15 and a pressure roller 16 brought into press contact with each other. The fixing roller 15 has a heater therein. The fixing unit 4 conveys the sheet P while interposing the sheet P between the fixing roller 15 and the pressure roller 16, and heats and presses the toner image, thereby fixing the toner image to the sheet P.

The image reading device 100 has a scanner housing 101 placed on the upper side of the image forming apparatus body 1, and a document pressing cover 102 mounted on an upper surface of the scanner housing 101 so as to be openable and closable.

The scanner housing 101 has a rectangular box shape in appearance. The scanner housing 101 is formed on the upper wall thereof with an opening, and a contact glass 101a is mounted in the opening. In the scanner housing 101, a reading unit is received to optically read an image of a document placed on the contact glass 101a. The reading unit emits light from a light source toward the document placed on the contact glass 101a, reads reflected light by an image sensor to read the document image, and generates image data thereof.

<Configuration of Information Reading Unit>

Figure 4:
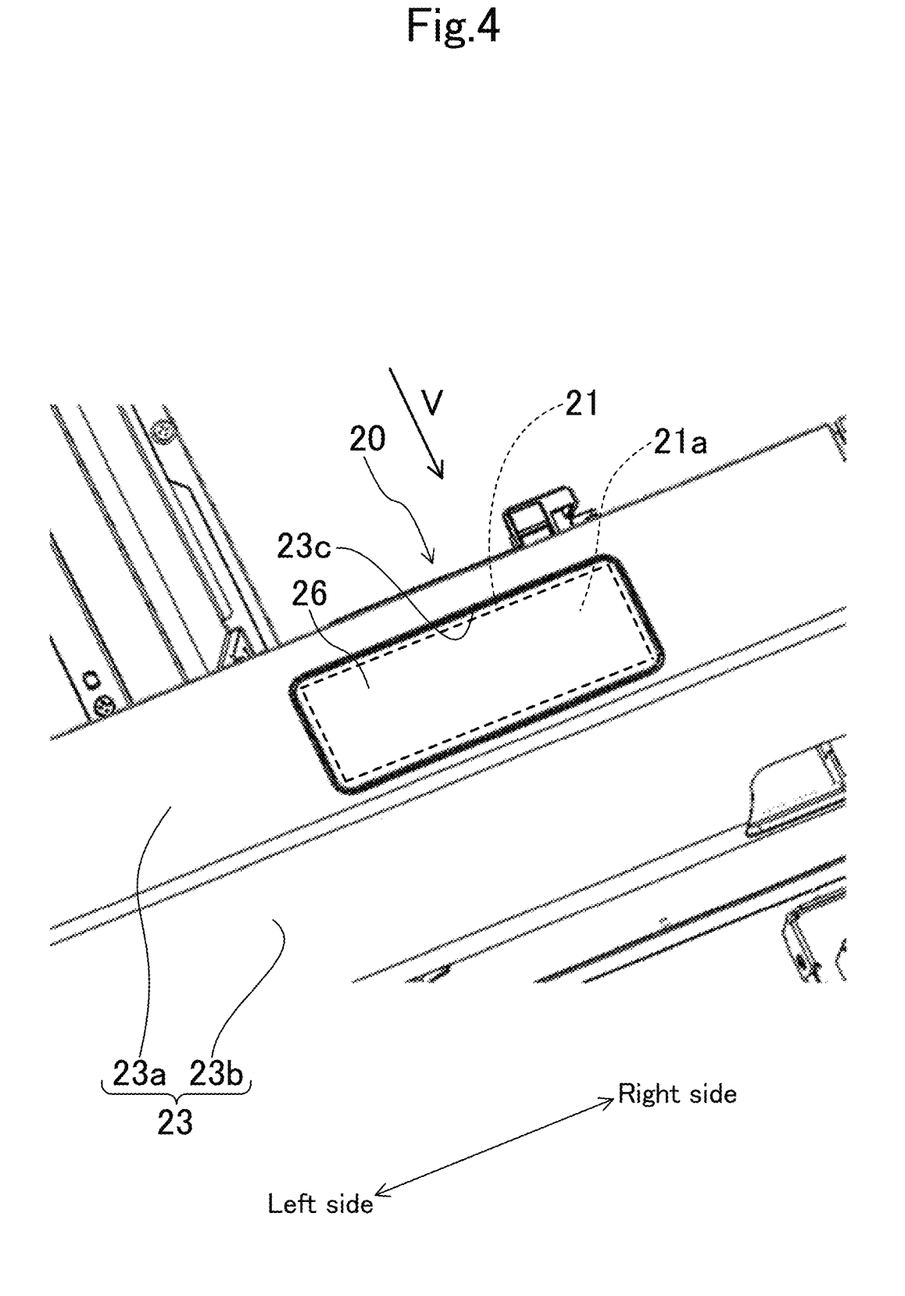
FIG. 4 is a perspective view when an information reading unit of an IC card is viewed from an obliquely upper side.

As illustrated in FIG. 2 to FIG. 4, the information reading unit 20 is positioned at the center in a right and left direction of an exterior cover 23 provided on the front side of the scanner housing 101.

The information reading unit 20 has an IC card reader 21. The IC card reader 21 has a flat rectangular box shape in appearance. The IC card reader 21 is provided on the upper surface thereof with a detection surface 21a (see FIG. 4). When a user holds an IC card over the detection surface 21a, data such as a personal code input to the IC card is read by the IC card reader 21. The IC card reader 21 is not provided as standard in the image forming apparatuses X and is provided as an option only when a user desires.

Figure 5:
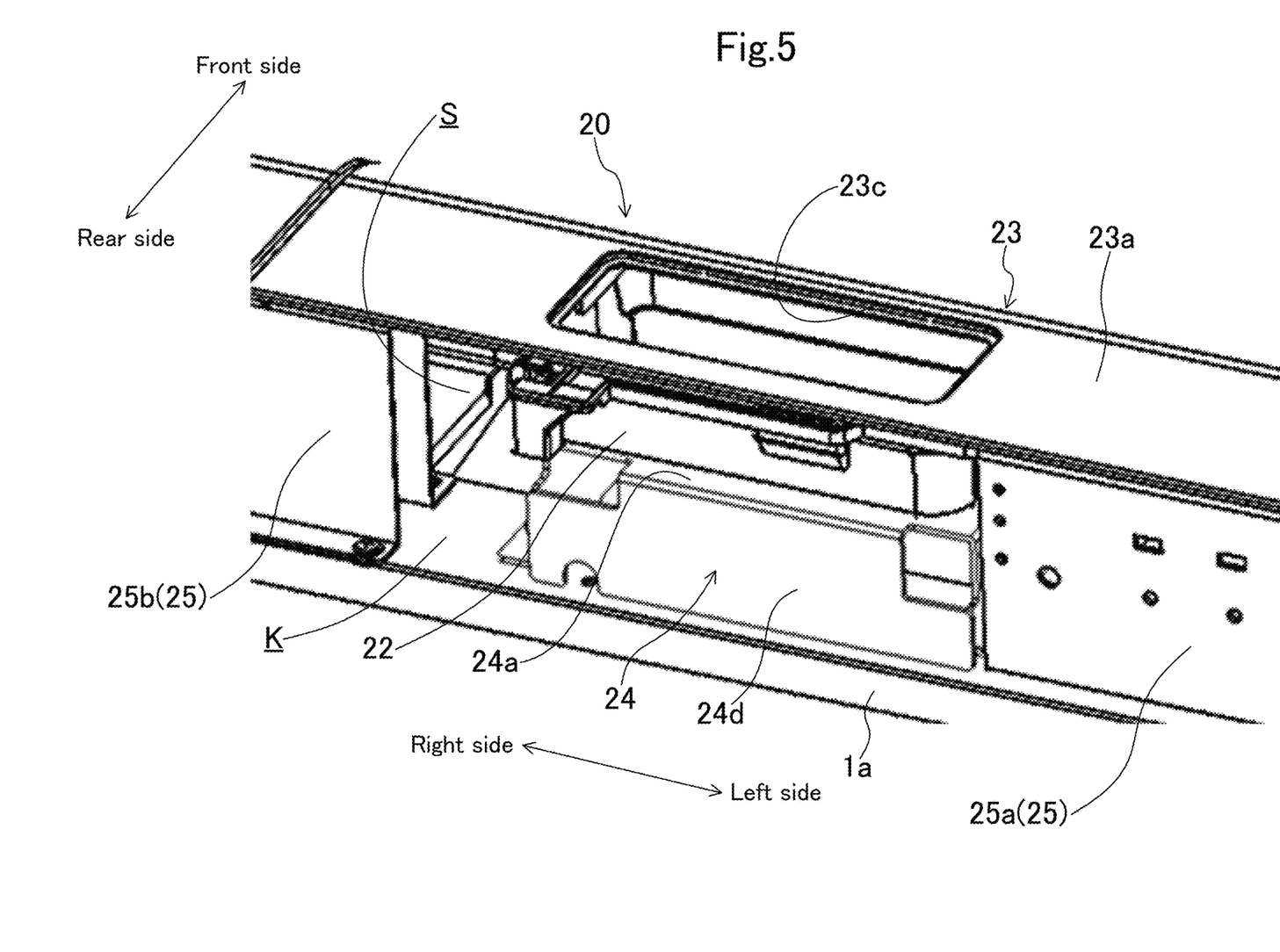
FIG. 5 is a view in the direction of the arrow V in FIG. 4.

As illustrated in FIG. 5, a holder 22 is used to mount the IC card reader 21. The holder 22 includes a resinous member having a rectangular box shape, and the IC card reader 21 is fitted and held in the holder 22. When the holder 22 is used, wiring work and the like of the IC card reader 21 are simplified, so that the mounting of the IC card reader 21 is facilitated.

The holder 22 is mounted in a holder receiving space S (a holder receiving part) between the exterior cover 23 and the upper surface of a frame member 1a of the image forming apparatus body 1. The exterior cover 23 extends in the right and left direction so as to cover the entire front side surface of the scanner housing 101. The exterior cover 23 is a resinous cover having an L shaped section and including a horizontal part 23a and a vertical part 23b (see FIG. 4). The horizontal part 23a of the exterior cover 23 is level with the upper surface of the scanner housing 101 (not illustrated in FIG. 4) and is approximately continuously connected to the upper surface. The vertical part 23b is disposed in parallel to the front side surface of the scanner housing 101 with a space therebetween. The frame member 1a is a plate-like member made of a metal member such as an iron plate. The frame member 1a extends over the entire right and left direction along the front end edge of the upper surface of the image forming apparatus body 1.

The aforementioned holder 22 is fixed to the upper surface of the aforementioned frame member 1a via a height determining member 24, which will be described later, in the holder receiving space S. Moreover, a support frame member 25 (an example of a predetermined frame member. See FIG. 5) is fixed to the upper surface of the frame member 1a to support the exterior cover 23 from a back surface of the exterior cover 23. The support frame member 25 includes a metal member having a channel-shaped section and extending in the right and left direction along the front side surface of the scanner housing 101. The support frame member 25 also serves as a regulating member that regulates the position of the front side surface of the scanner housing 101.

The support frame member 25 has a dividing part K at a position behind the aforementioned holder receiving space S. The support frame member 25 is divided into a left support frame part 25a on the left side and a right support frame part 25b on the right side with the dividing part K interposed therebetween.

In the aforementioned exterior cover 23, a rectangular opening 23c is formed at a position on the upper side of the holder receiving space S and extends in the right and left direction. The opening 23c is closed by a plate-like transmitting plate 26 (see FIG. 4) through which electric waves of the IC card reader 21 easily transmit. By so doing, the transmitting plate 26 constitutes a part of the exterior cover 23. The aforementioned height determining member 24 performs positioning of the holder 22 in a height direction such that the detection surface 21a of the IC card reader 21 approximately abuts a lower surface of the transmitting plate 26 (that is, is positioned at a predetermined height). Furthermore, in the present embodiment, the height determining member 24 also performs positioning in a horizontal plane, which will be described later, as well as the height determining of the holder 22 (positioning the right and left direction and the front and rear direction).

<Configuration of Height Determining Member>

Figure 6:
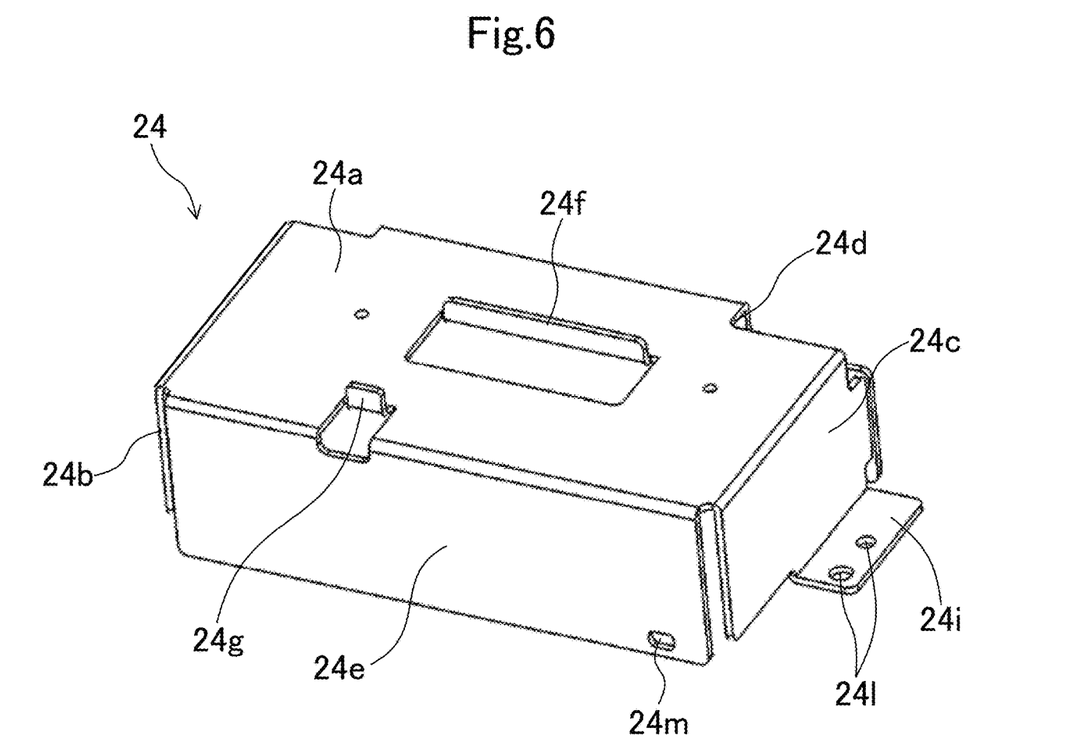
FIG. 6 is a perspective view illustrating a height determining member.
Figure 7:
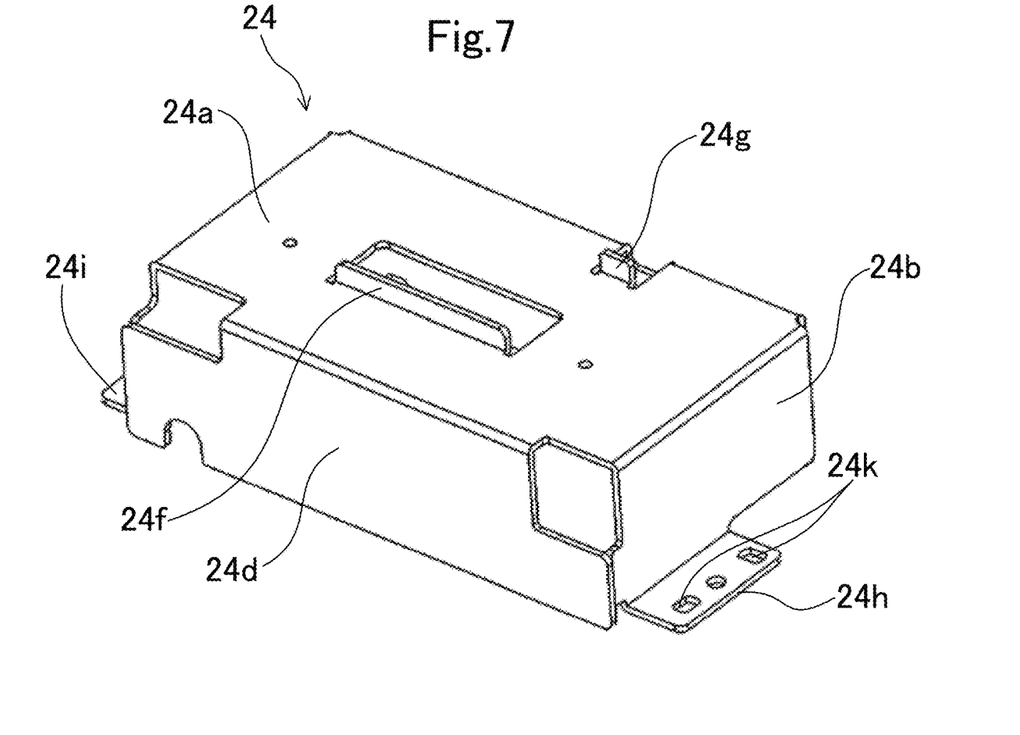
FIG. 7 is a perspective view illustrating the height determining member.

As illustrated in FIG. 6 and FIG. 7, the height determining member 24 has a rectangular box shape opened downward. The height determining member 24 is formed by bending a sheet metal member. Specifically, the height determining member 24 has a rectangular placing plate part 24a on which the holder 22 is placed, and four vertical plate-like leg plate parts 24b to 24e that are bent downward and hung down from four sides of the placing plate part 24a.

At the center of the placing plate part 24a, an engaging piece 24f is formed and bent to extend in a longitudinal direction and to be upright. Furthermore, in the vicinity of one side extending in the longitudinal direction of the placing plate part 24a, a small piece-like position regulating plate 24g is formed and bent to be upright in parallel to the engaging piece 24f.

The four leg plate parts 24b to 24e include a pair of leg plate parts 24b and 24c facing each other in the longitudinal direction of the placing plate part 24a, and a pair of leg plate parts 24d and 24e facing each other in the short direction thereof. The pair of leg plate parts 24b and 24c are respectively provided at the lower ends thereof with mounting plate parts 24h and 24i that are bent at a right angle outward in the longitudinal direction and are projected. Each of the mounting plate parts 24h and 24i is formed with two bolt insertion holes 24k and 24l.

Figure 8:
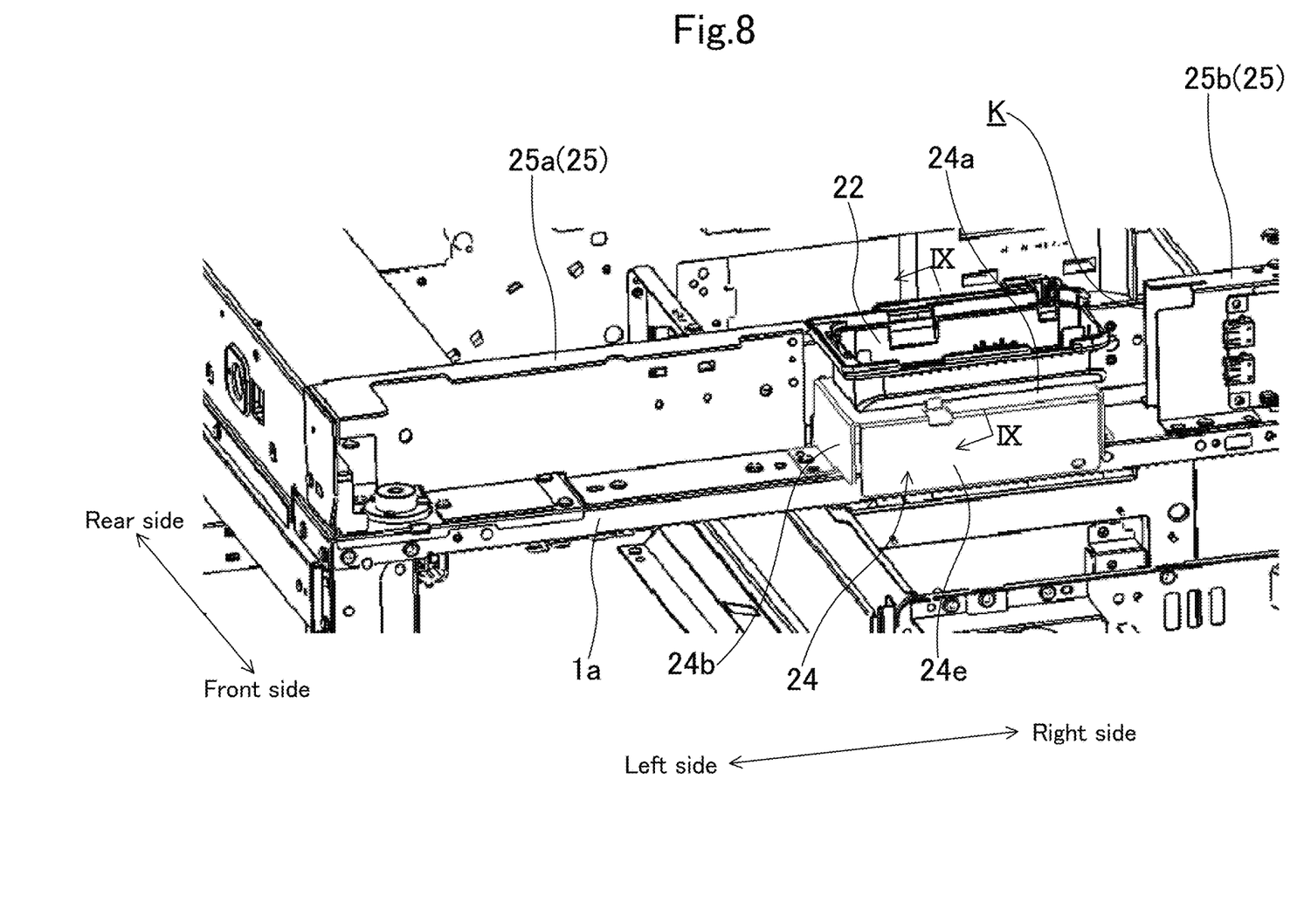
FIG. 8 is a perspective view illustrating a mounting structure of a holder when an IC card reader is mounted as an option.

As illustrated in FIG. 8, when the IC card reader 21 is mounted, the height determining member 24 is fixed to the upper surface of the frame member 1a using bolts in a state in which the holder placing surface of the placing plate part 24a is directed upward. Furthermore, in such a fixed state, the longitudinal direction of the height determining member 24 coincides with the right and left direction. The holder 22 is placed on the upper surface of the placing plate part 24a, so that the holder 22 is positioned to be higher than the upper surface of the frame member 1a by the heights of the four leg plate parts 24b to 24e.

Figure 9:
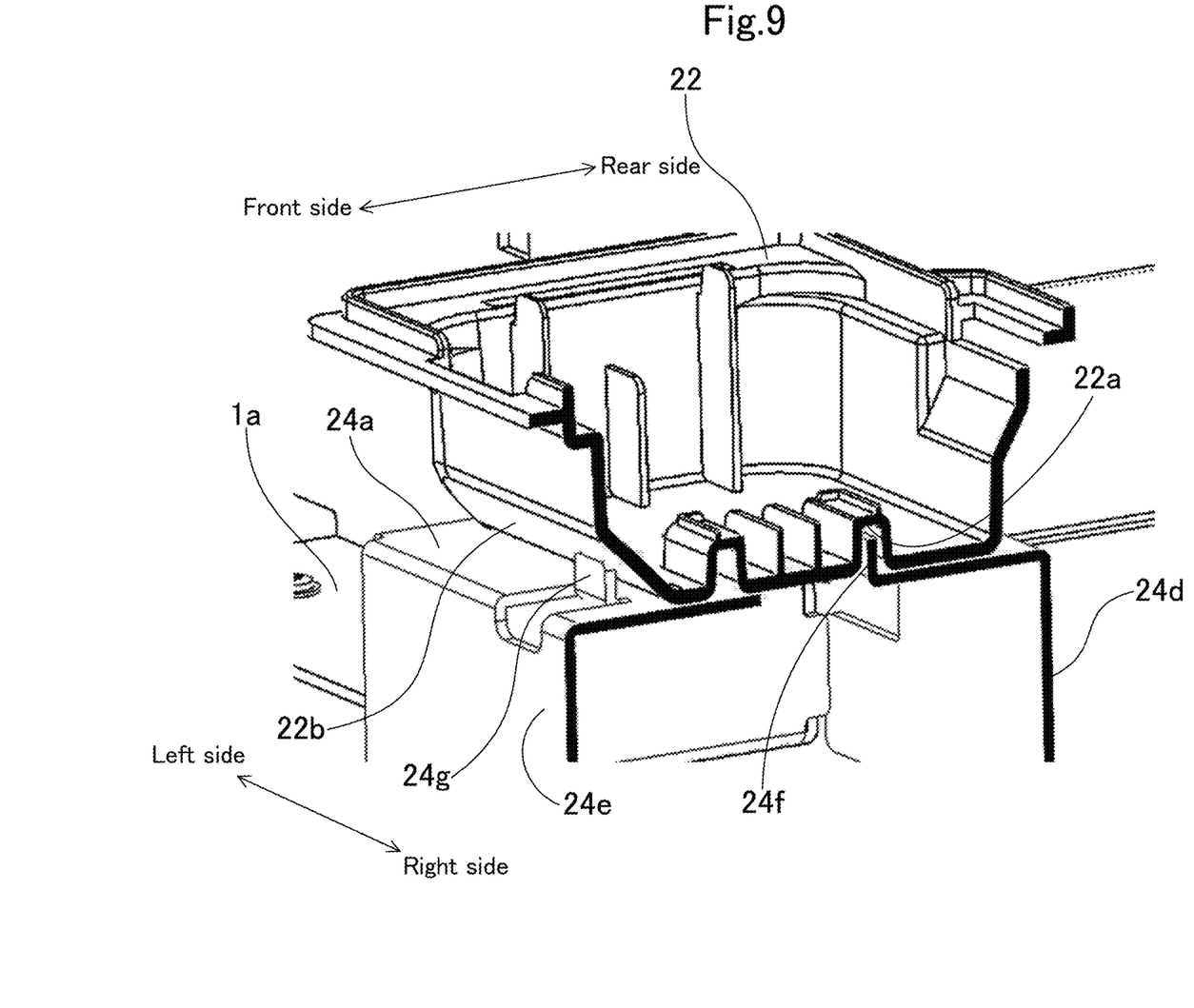
FIG. 9 is a sectional view taken along line IX-IX in FIG. 8.

Furthermore, as illustrated in FIG. 9, the holder 22 is formed on the bottom surface thereof with an engaging concave part 22a extending in the right and left direction. When the holder 22 is placed on the upper surface of the placing plate part 24a, the engaging concave part 22a is engaged with the engaging piece 24f upright from the placing plate part 24a. Accordingly, the positioning of the holder 22 in the right and left direction and the front and rear direction is performed. Furthermore, in the state in which the holder 22 is placed on the upper surface of the placing plate part 24a, the aforementioned position regulating plate 24g abuts an inclined wall 22b at the lower end of the holder 22, so that the holder 22 is firmly positioned so as not to be movable in the front and rear direction.

As described above, the height determining member 24 serves as a positioning member of the holder 22 when the IC card reader 21 is mounted, and serves as a part of the support frame member 25 when the IC card reader 21 is not mounted.

Figure 10:
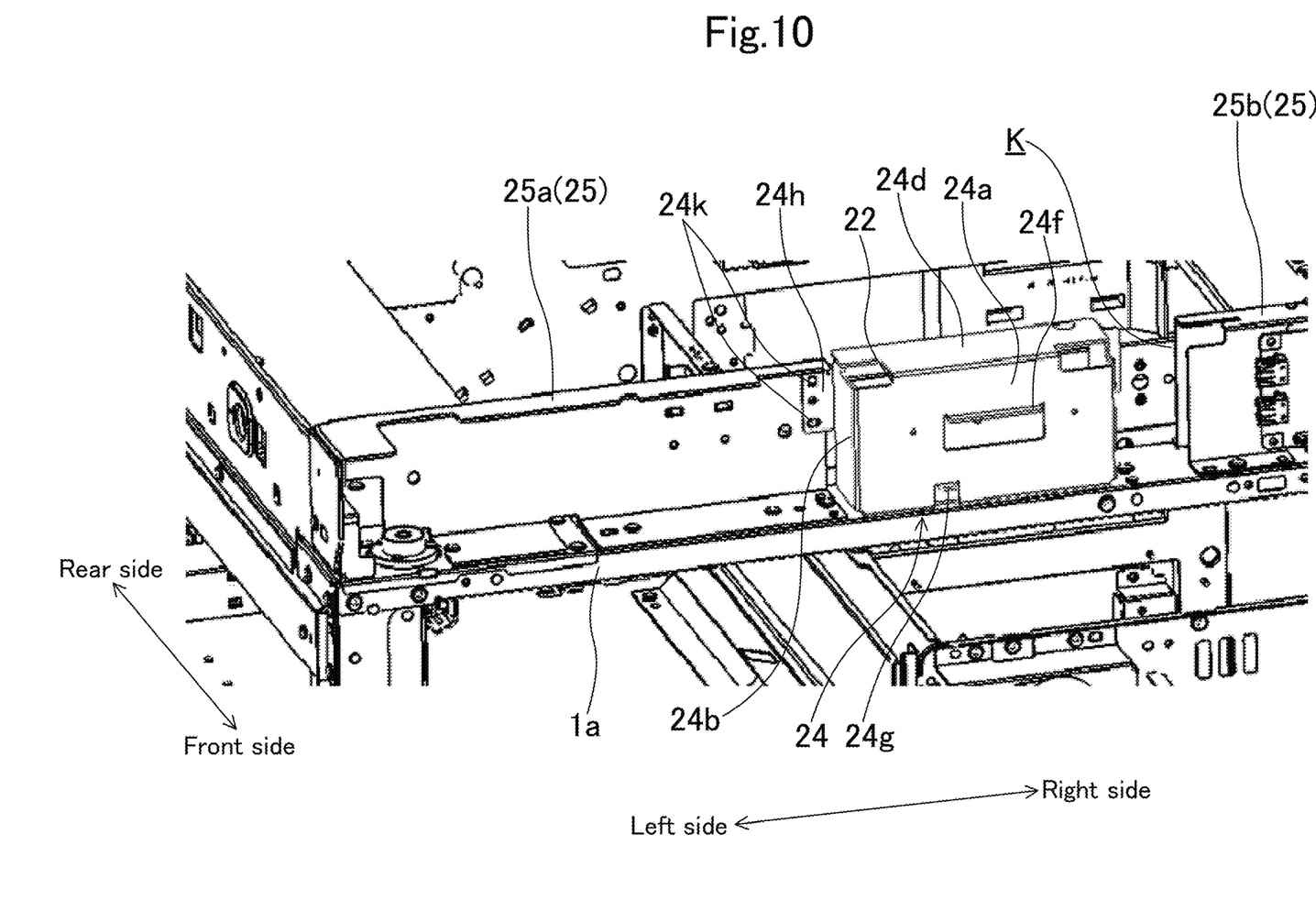
FIG. 10 is a view corresponding to FIG. 8 when the IC card reader is not mounted.

FIG. 10 illustrates a state in which the height determining member 24 serves as a part of the support frame member 25. In such a case, the height determining member 24 is disposed in a state in which the placing surface of the placing plate part 24a is directed frontward and the leg plate parts 24b to 24e extend rearward from the placing plate part 24a. Then, the mounting plate part 24h of the leg plate part 24b extending from the left end edge of the placing plate part 24a is allowed to abut the front side surface of the left support frame part 25a. In such a state, the mounting plate part 24h is fixed to the left support frame part 25a by the bolts inserted into the bolt insertion holes 24k. Furthermore, a bolt is inserted into a bolt insertion hole 24m of the leg plate part 24e (see FIG. 6), so that the leg plate part 24e is fixed to the upper surface of the frame member 1a.

Figure 11:
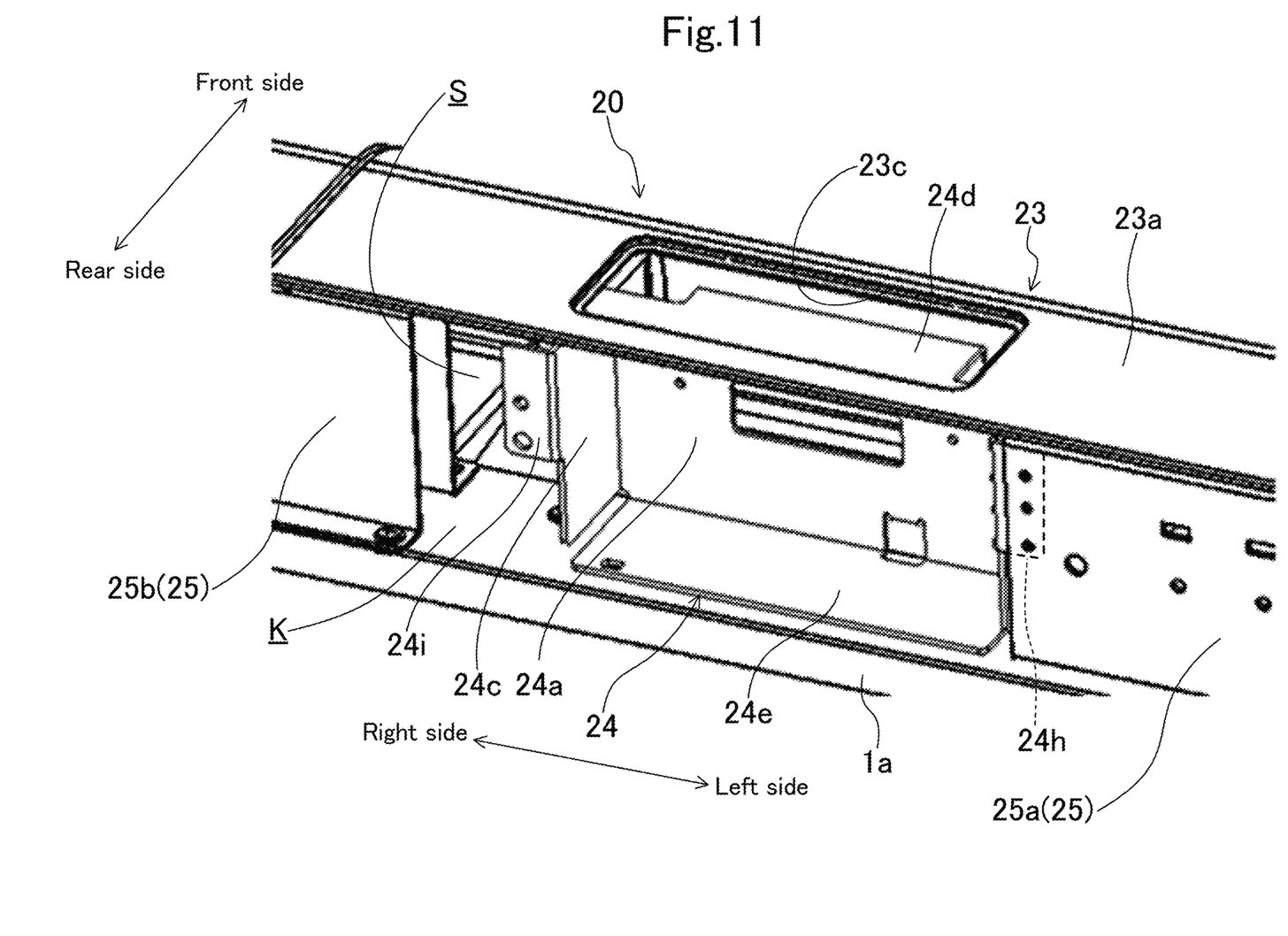
FIG. 11 is a view corresponding to FIG. 5 when the IC card reader is mounted.

The upper end surface (one side surface of the leg plate part 24d in a thickness direction) of the height determining member 24 fixed by so doing is positioned at the same height position as the upper end surfaces of the left and right support frame parts 25a and 25b and serves as a support surface of the exterior cover 23 and the transmitting plate 26 (a part of the exterior cover 23) as illustrated in FIG. 11.

<Operation and Effect>

As described above, the image forming apparatus X includes the height determining member 24 that performs the positioning in the height direction of the holder 22 that holds the IC card reader 21. When the holder 22 is not mounted, the height determining member 24 is assembled to the support frame member 25 that supports the back surface of the exterior cover 23, thereby serving as a part of the support frame member 25. On the other hand, when the holder 22 is mounted, the height determining member 24 is separated from the support frame member 25, is used by changing the direction thereof, and is interposed between the holder 22 and the bottom surface of the holder receiving space S (the upper surface of the frame member 1a) to allow the detection surface 21a of the IC card reader 21 to be positioned at a predetermined height.

According to such a configuration, the height determining member 24, which is an unnecessary component, is effectively used as a part of the support frame member 25 for a user who does not desire the mounting of the IC card reader 21. Therefore, it is possible to avoid an increase in cost due to an increase in unnecessary (wasteful) components. Furthermore, since the height determining member 24 needs not to be newly purchased as an option component for a user who desires the mounting of the IC card reader 21, cost burden is reduced. Furthermore, since it is possible to use the existing holder 22, it is possible to reduce cost compared to a case of newly designing and manufacturing a dedicated holder.

Furthermore, the upper end surface of the height determining member 24 when the holder 22 is not mounted is positioned at the same height as the upper end surface of the support frame member 25, thereby serving as a support surface that supports the back surface of the exterior cover 23.

In this way, the height determining member 24 can be allowed to effectively serve as a part of the support frame member 25.

Furthermore, in the exterior cover 23, the opening 23c is formed on the upper side of the holder receiving space S and is closed by the transmitting plate 26 through which the electric waves of the IC card reader 21 transmit. Furthermore, when the holder 22 is mounted, the height determining member 24 performs the positioning in the horizontal plane of the holder 22 by the engaging piece 24f such that the detection surface 21a of the IC card reader 21 is positioned on the lower side of the transmitting plate 26.

Consequently, the height determining member 24 is also used as the positioning member in the horizontal plane of the holder 22. Thus, the number of components is reduced, so that it is possible to achieve cost reduction.

What is claimed is:

1. An image forming apparatus comprising:
   a holder receiving part in which a holder for holding an IC card reader is mounted as an option component; and
   a height determining member that performs positioning of the holder in a height direction,
   wherein, when the holder is not mounted, the height determining member is assembled to a predetermined frame member to serve as a part of the predetermined frame member, and when the holder is mounted, the height determining member is separated from the predetermined frame member, is used by changing a direction thereof, and is interposed between the holder and a bottom surface of the holder receiving part to allow a detection surface of the IC card reader to be positioned at a predetermined height.

2. The image forming apparatus of claim 1, comprising:
   an image forming apparatus body; and
   an image reading device provided on an upper side of the image forming apparatus body,
   wherein the image reading device has a scanner housing mounted on an upper surface thereof with a contact glass,
   the predetermined frame member is a support frame member that is mounted on an upper surface of a frame member of the image forming apparatus body and supports an exterior cover of the scanner housing from a back surface side, and
   when the holder is not mounted, an upper end surface of the height determining member is positioned at the same height as an upper end surface of the support frame member and serves as a support surface that supports a back surface of the exterior cover.

3. The image forming apparatus of claim 2, wherein the holder receiving part is provided in a space between the frame member of the image forming apparatus body and the exterior cover,
- in the exterior cover, an opening is formed on an upper side of the holder receiving part and is closed by a transmitting plate through which electric waves of the IC card reader transmit, and
- when the holder is mounted, the height determining member is configured to perform positioning in a horizontal plane of the holder such that the detection surface of the IC card reader is positioned on a lower side of the transmitting plate.

\* \* \* \* \*